United States Patent
Nasreddine et al.

(10) Patent No.: US 11,001,655 B2
(45) Date of Patent: May 11, 2021

(54) LOW TEMPERATURE CROSS LINKABLE POLYCHLOROPRENE COMPOSITIONS

(71) Applicant: ARLANXEO DEUTSCHLAND GMBH, Dormagen (DE)

(72) Inventors: Victor Nasreddine, Cologne (DE); Nicolas Sary, Dormagen (DE); Martin Schneider, Cologne (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 225 days.

(21) Appl. No.: 16/064,733

(22) PCT Filed: Nov. 25, 2016

(86) PCT No.: PCT/EP2016/078810
§ 371 (c)(1),
(2) Date: Jun. 21, 2018

(87) PCT Pub. No.: WO2017/108331
PCT Pub. Date: Jun. 29, 2017

(65) Prior Publication Data
US 2019/0002605 A1    Jan. 3, 2019

Related U.S. Application Data

(62) Division of application No. PCT/EP2016/078810, filed on Nov. 25, 2016.

(30) Foreign Application Priority Data

Dec. 23, 2015 (EP) .................................. 15202499

(51) Int. Cl.
| | | |
|---|---|---|
| C08F 36/18 | (2006.01) | |
| C08C 19/00 | (2006.01) | |
| C08L 11/00 | (2006.01) | |
| C08C 1/15 | (2006.01) | |
| C08C 1/14 | (2006.01) | |

(52) U.S. Cl.
CPC ............... *C08F 36/18* (2013.01); *C08C 1/14* (2013.01); *C08C 1/15* (2013.01); *C08C 19/00* (2013.01); *C08L 11/00* (2013.01)

(58) Field of Classification Search
CPC ................................. C08F 36/18; C08C 19/00
See application file for complete search history.

(56) References Cited

U.S. PATENT DOCUMENTS

| | | |
|---|---|---|
| 2,187,146 A | 1/1940 | Calcott et al. |
| 3,310,546 A * | 3/1967 | Becker .................. C08K 5/098 |
| | | 525/364 |
| 3,761,455 A | 9/1973 | Takashi Tamaka et al. |
| 7,169,937 B2 | 1/2007 | Achten et al. |
| 7,825,193 B2 | 11/2010 | Achten et al. |
| 7,977,431 B2 | 7/2011 | Achten et al. |
| 9,410,027 B2 | 8/2016 | Säwe et al. |
| 9,475,895 B2 | 10/2016 | Sunada et al. |
| 2004/0110964 A1 | 6/2004 | Achten et al. |
| 2007/0078229 A1 | 4/2007 | Achten et al. |
| 2011/0015360 A1 | 1/2011 | Achten et al. |
| 2011/0092358 A1 | 4/2011 | Säwe et al. |
| 2014/0046015 A1 | 2/2014 | Neuner et al. |
| 2014/0128538 A1* | 5/2014 | Yarzabel .............. C08K 5/0025 |
| | | 524/567 |
| 2015/0203613 A1 | 7/2015 | Sunada et al. |
| 2017/0334516 A1 | 11/2017 | Ferguson |

FOREIGN PATENT DOCUMENTS

| | | |
|---|---|---|
| CA | 2 833 318 A1 | 10/2012 |
| CN | 1495161 A | 5/2004 |
| CN | 103492435 A | 1/2014 |
| CN | 104662079 A | 5/2015 |
| JP | 57-063304 A | 4/1982 |
| JP | 2002-060550 A | 2/2002 |
| JP | 2011-038101 A | 2/2011 |
| TW | 201637934 A | 11/2016 |
| WO | 2012/143336 A1 | 10/2012 |
| WO | 2012/143459 A1 | 10/2012 |
| WO | 2014/054388 A1 | 4/2014 |

OTHER PUBLICATIONS

Fuchs et al., Improvement of the Crosslinking of Polychloroprene, KGK Kautschuk Gummi Kunstaalotte 53, Jahrgang, Nr. 7-8 (2000 ).*
Songkot Utara et al.; "Effect of Divalent Metal Ions on Curing Characteristics and Dynamic Mechanical Properties of Natural Rubber"; Macromol Symp. 2015, 354, pp. 287-293.
Fuchs, "Improvement of the Crosslinking of Polychloroprene," Presented at a Meeting of American Chemical Society, Rubber Division, held Sep. 29-Oct. 2, 1998, Nashville, TN, USA, abstract.
Varnhorn, "A new Polychloroprene polymer for Improved curing with 3-Methyl-thiazolidine-thione-2 (MTT)," Presented Fall 184th Technical Meeting of American Chem Soc, Rubber Division, held Oct. 8-100, 2013, Cleveland, OH USA, abstract.

* cited by examiner

*Primary Examiner* — Robert D Harlan
(74) *Attorney, Agent, or Firm* — Norris McLaughlin, P.A

(57) ABSTRACT

Essentially ethylene thiourea free cross linkable composition comprising a chloroprene rubber having defined contents of cations from the second or third main group and resinate anions are provided, which possess improved curing characteristics for increased productivity and lower vulcanization temperatures for energy-saving manufacturing methods and vulcanizates obtained by using said chloroprene rubber.

10 Claims, No Drawings

LOW TEMPERATURE CROSS LINKABLE POLYCHLOROPRENE COMPOSITIONS

The invention relates to a chloroprene rubber, a process for producing it, cross linkable compositions based on this chloroprene rubber, a process for producing vulcanizates from these compositions, and the vulcanizates obtained thereby.

For the purposes of the present invention, chloroprene rubbers, also referred to as "CR" for short, are copolymers of chloroprene and optionally one or more comonomers, for instance 2,3-dichlorobutadiene, 1-chlorobutadiene, butadiene, isoprene, acrylic acid, methacrylic acid, acrylonitrile, methacrylonitrile, sulfur, acrylate or methacrylate derivatives, diacrylate or dimethacrylate or styrene. The amount of comonomers is generally not more than 25%, preferably not more than 20%, more preferably not more than 15% and most preferably not more than 10% of the total mass of the copolymer. Chloroprene rubber is known for its unique combination of properties: very good mechanical and dynamical properties, good resistance to ageing and solvents, as well as a superior flame resistance.

The production of CR is generally carried out by emulsion polymerization, as described, e.g. in Ullmann's Encyclopädie der technischen Chemie, 2004, Rubber, 3. Synthetic, p. 15 et seqq., "Encyclopedia of Polymer Science and Technology", Vol. 3, p. 705-730, John Wiley, New York 1965, P. R. Johnson, Rubber Chem. Technol. 49 (1976) 650-702. By emulsion polymerization of chloroprene (2-chloro-1,3-butadiene), polychloroprene dispersions are produced which are also referred to as polychloroprene latices.

For the production of such latices, the monomers are admixed in an emulsifier system in an aqueous medium. This emulsifier system is generally based on resin acids, in particular resin acids from disproportionated rosin. The temperature range in which the polymerization is performed encompasses values from approx. 0° C. to more than 80° C. Thus, the polymerization can be initiated by thermal free-radical initiators or by redox systems. In general, molecular weight regulators such as mercaptans or xanthogen disulphides are also used. In some cases, the molecular weight of the end product is also adjusted by copolymerization with sulphur and subsequent cleavage of the sulphidic bonds formed. The desired conversion is established by stopping the reaction with a suitable reagent. For obtaining a solid chloroprene rubber, the polychloroprene latices are then either first destabilized by lowering the pH and then coagulated by freeze coagulation e.g. as described in U.S. Pat. No. 2,187,146A or by using salts as described in WO2012/143336 A1 and WO2012/143459 A1.

The vulcanization of chloroprene rubbers is typically carried out using metal oxides such as MgO and ZnO in the presence of vulcanization accelerators. The most efficient vulcanization accelerator is ethylene thiourea (ETU). However, due to its toxicity, ETU has to be replaced by more environmental friendly cure agents. It was found to be difficult to achieve suitable vulcanization rates with less toxic cure agents such as N-methyl-thiazolidine-2-thione (MTT), having a negative impact on the productivity. Moreover, this problem increases at lower vulcanization temperatures e.g. below 180° C. A lower vulcanization temperature would be advantageous in terms of less rubber deterioration, energy savings, and allowing the use of thermally less stable additives.

It is therefore an object of the present invention to provide chloroprene rubber containing compositions being essentially free of ETU which possess an accelerated vulcanization at temperatures below 180° C.

The term essentially free of ETU should in the context of the present invention be understood as containing less than 0.5% by weight, preferably less than 0.1% by weight and most preferably less than 0.01% by weight ETU based on the total amount of chloroprene rubber.

It has surprisingly been found that chloroprene rubber compounds exhibiting a favorable balance between scorch safety (MS t5), effective vulcanization time (t90-t10) at moderate temperature (e.g. between 140° C. and 170° C.), and good vulcanizate properties are obtained when the chloroprene rubber contains cations from the second or third main group, preferably calcium, magnesium, aluminium or a combination thereof, more preferably calcium, magnesium, or a combination thereof and most preferably calcium in an amount from 0.05% by weight to 0.25% by weight and resinate anions in an amount from 0.3% by weight to less than 2.5% by weight based on the total amount of chloroprene rubber.

The term resinate anions as used in the context of the present invention shall include all anions of resin acids, in particular anions of abietic acid, dehydroabietic acid, dihydroabietic acid, neoabietic acid, palustric acid, levopimaric acid, pimaric acid or isopimaric acid, as well as their isomers, hydrogenated forms and dehydrogenated forms. The latter three are typically obtained by treatment of rosin with a noble metal catalyst, in particular a Pd-catalyst or with an acid and are often referred to as disproportionated rosin. Preferably, the term resinate anions should be understood as anions of abietic acid, dehydroabietic acid and dihydroabietic acids.

Preferably, the amount of resinate anions is from 0.4% by weight to 2.3% by weight, preferably from 0.5% by weight to 2.0% by weight, based on the total amount of chloroprene rubber.

Preferably, the amount of cations of metals from the second and third main group, preferably calcium, magnesium, aluminium or a combination thereof, more preferably calcium, magnesium or a combination thereof and most preferably calcium is from 0.09% by weight to 0.23% by weight.

More preferably, the amount of cations of metals from the second and third main group, preferably calcium, magnesium, aluminium or a combination thereof, more preferably calcium, magnesium or a combination thereof and most preferably calcium is from 0.12% by weight to 0.21% by weight, based on the total amount of chloroprene rubber.

Preferably, the amount of resinate anions and the amount of cations of metals from the second and third main group should be understood as the amount of said substances introduced during the production of the polychloroprene latices up to and including the coagulation of the lattices.

The present invention also provides a process for the production of the chloroprene rubbers according to the invention comprising the steps of adjusting the pH of a latex obtained by emulsion polymerization of chloroprene to a value from 10.5 to 6.5, preferably from 10.0 to 7.0 and a step where the pH-adjusted latex is coagulated by addition of a salt of a metal of the second main group.

The adjustment of pH can be carried out by addition of an organic or inorganic acid, preferably an aqueous acid or carbon dioxide, more preferably aqueous acetic or hydrochloric acid, more preferably aqueous acetic acid and most preferably 20% aqueous acetic acid.

The coagulation can be performed with water soluble polyvalent salts. Suitable salts are second main group metal salts and/or third main group metal salts, in particular salts of $Ca^{2+}$, $Mg^{2+}$, $Sr^{2+}$ and/or $Al^{3+}$ with for instance sulfate, chloride, nitrate. Water soluble means a solubility of at least 0.1 g of salt in 1 liter of water at room temperature.

Preferably calcium chloride or magnesium chloride is applied. Preferably, the salts are added in form of an aqueous solution.

After the coagulation, the coagulate is usually separated from the liquid phase and subsequently washed and dried by conventional methods as described in the prior art above.

By the above process, the lowered pH causes part of the resin acid salts, used as emulsifiers for the polymerization reaction, to be converted into the acid form, whereas a part of said resin acid salts remain as resinate anions. When the water-soluble salts having cations of second or third main group elements are added, the remaining resinate anions at least partially form only slightly soluble salts with the cations of the second or third main group, which remain finely distributed in the coagulated chloroprene rubber. Surprisingly, when latices are used containing the resin acid based emulsifiers in amounts conventionally employed for emulsion polymerization of chloroprene, the above process leads to chloroprene rubbers containing the resinate anions and the cations from the second or third main group in the amount according to the invention. The present invention also concerns chloroprene rubbers obtainable by the above process.

The present invention also relates to cross-linkable compositions comprising a chloroprene rubber according to the invention and a cross-linker, preferably a metal oxide, more preferably a metal oxide selected from zinc oxide and magnesium oxide and mixtures thereof. In a preferred embodiment, the cross-linkable compositions are essentially free of ETU. Preferably, the cross-linkable compositions comprise a vulcanization accelerator different from ETU. In a further preferred embodiment, the cross linkable compositions contain N-methyl-thiazolidine-2-thione.

The present invention further relates to a process for the production of vulcanizates wherein cross linkable composition according to the invention are heated to a temperature from 100° C. to less than 180° C., preferably from 120° C. to 170° C. and most preferably from 140° C. to 160° C.

The present invention also relates to vulcanizates obtainable by the above vulcanization process or from the cross linkable compositions according to the invention or from a chloroprene rubber according to the invention and to molded bodies comprising such vulcanizates, in particular molded bodies in form of air springs, conveyor belts, belts, cv boots, bridge bearings, wiper blades or diving suits.

The present invention further relates to the use of the chloroprene rubbers according to the invention for the manufacture of cross linkable compositions, vulcanizates and molded bodies.

EXAMPLES

The chloroprene latices used for the following examples were obtained by the following polymerization recipe (batch experiments, quantities given in parts by weight):

| | |
|---|---|
| Chloroprene and 2,3-dichlorobutadiene | 100 |
| Desalinated water | 125 |
| Resin acid | 3 |
| Na-Salt of condensation product consisting of naphthalene sulfonic acid and formaldehyde | 0.5 |
| n-Dodecylmercaptan (n-DDM) | 0.2 |
| KOH | 0.5 |

The polymers obtained from 100 parts by weight technical grade chloroprene were referred to as "homopolymers", whereas the polymers obtained from a monomer mixture comprising 93 parts by weight technical grade chloroprene and 7 parts by weight technical grade 2,3-dichlorobutadiene were referred to as "copolymers".

The technical grade chloroprene may also contain 1-chlorobutadiene, typically in an amount of from 0% to 2% by weight.

The polymerization was carried out in a 4 L flask. The aqueous phase made of desalinated water, resin acid, KOH and a Na-Salt of the condensation product of naphthalene sulfonic acid and formaldehyde was placed in this vessel, flushed with nitrogen and heated to a temperature of 45° C. The monomers were added when the medium temperature reached 40° C. Subsequently, the emulsion temperature was stabilized at 45° C. before starting the polymerization.

The polymerization was started by constantly adding a solution of thiourea dioxide in water (3% by weight) at flow rate between 0.1 ml/min and 5 ml/min, the latter being adjusted to achieve 70% monomer conversion within 180 min. The conversion rate was determined by gravimetric analysis. The polymerization was stopped with a 0.03% parts by weight, based on the latex, of an aqueous 2.5% by weight solution of diethyl hydroxylamine when the monomer conversion reached 70%.

The latex was degassed to a residual chloroprene content below 1000 ppm based on the latex.

For reference examples 1 and 2, the degassed latex pH was adjusted to 7.5 with a 20% by weight aqueous acetic acid solution. The polymer was isolated by freezing coagulation and washed with salt-free water. The sheets obtained were dried to a residual moisture content below 0.6% by weight in a circulating air drying cupboard at 70° C.

For reference examples 3 to 5, the degassed latex was diluted with water to a 15% solid content and its pH adjusted to a value between 13 and 11 by addition of 20% aqueous acetic acid. The latex was then precipitated with 0.25% calcium chloride in water at room temperature. The coagulate was washed with salt-free water and dried to a residual moisture content below 0.6% by weight in a circulating air drying cupboard at 70° C.

For inventive examples 1 to 4, the degassed latex was diluted with water to 15% solid content and its pH adjusted to a value between 10 and 7 with a 20% aqueous acetic acid. The latex was then precipitated with 0.25% calcium chloride in water at room temperature. The coagulate was washed with salt-free water and dried to a residual moisture content below 0.6% by weight in a circulating air drying cupboard at 70° C.

All rubber compounds were based on the following recipe:

| No. | Component | phr |
|---|---|---|
| 1 | Chloroprene rubber (homo- or copolymer) | 100 |
| 2 | Carbon Black N772 | 30 |
| 3 | Stearic acid | 0.5 |
| 4 | Maglite DE | 4.1 |
| 5 | Rhenogran MTT-80 | 0.5 |
| 6 | Zinc Oxide read seal | 5 |

[1] phr: parts per hundred rubber

They were processed in a 1.5 l intermeshing internal mixer according to the following sequence:

| Absolute time [min] | Rotation speed [RPM] | Components added (No.) |
|---|---|---|
| 0 | 44 | 1 |
| 4 | 44 | 2, 3, 4 |
| 6 | 44 | 5, 6 |
| 7 | end | |

Methods

The latex pH was measured with a Schott H 63 glass electrode (Electrolyte: KCl 3 mol/l, Silamid reference system) at 20° C.

In the absence of disturbing substances (e.g. additives) the resinate anion content could be determined by titration of a 2.2% by weight polymer solution in tetrahydrofuran with a 0.1M Perchloric acid solution. The titration was monitored by potentiometry (Metrohm Solovotrode Nr 6.0229.100), the volume of perchloric acid added to reach the first potential step ($V_{equivalent}$) was used to calculate the salt amount in the polymer:

$$\text{Resinate anion } [\%] = \frac{V_{equivalent} \times 300.5}{mass_{polymer\ solution} \times 2.2}$$

Where:

$V_{equivalent}$ is expressed in milliliters $Mass_{polymer\ solution}$ is expressed in grams The resulting value is the salt content expressed as a percentage value For the ion concentration determination, about 0.2 g rubber sample was digested with mineral acid (5 mL HNO$_3$ (63%), 3 mL H2O) in a microwave oven (Mikrowelle Ultraclave III) according to the following temperature program:

| | |
|---|---|
| 8 min 70° C. 100 bar | 700 Watt |
| 20 min 140° C. 120 bar | 700 Watt |
| 10 min 210° C. 160 bar | 1000 Watt |
| 12 min 250° C. 160 bar | 1000 Watt |
| 18 min 280° C. 160 bar | 1000 Watt |

The prepared sample was then analyzed by ICP-OES (Varian Vista Pro, wavelength 216.956 nm, 407.771 nm and 421.552 nm (reported value is the mean value), 1.2 kW plasma power, 15 l/min plasma gas, 10 s measurement time repeated 3 times, calibration with external standards. In ICP-OES analysis, atoms were excited by inductively coupled plasma. The emitted light of specific wavelength was detected and corresponded to their concentration (in % by weight) in the sample.

The Mooney scorch is determined at 120° C. according to DIN 53 523 Part 4 and MS-t5 as defined in paragraph 2.2 (MS-t5 is the time from the beginning of the measurement up to the point at which the Mooney viscosity increased by 5 Mooney units above the viscosity minimum).

The vulcanization behavior of the compositions was determined in a Monsanto rheometer MDR 2000E at 160° C. in accordance with DIN 53 529. The characteristic vulcanization times tS1, t10 and t90, as well as ΔS' were determined in this way.

In accordance with DIN 53 529, part 3:
- t10: time at which 10% of the conversion has been achieved
- t90: time at which 90% of the conversion has been achieved
- ΔS': difference between the maximum and the minimum torque The Shore A hardness (H), tensile strength (TS) and the elongation at break (EB) of the vulcanizates were determined by means of a tensile test in accordance with DIN EN ISO 868 and DIN 53504, respectively.

EXAMPLES

| Sample | Composition | pH Latex | resinate anion % | $Ca^{2+}$ % | Scorch MS t5 min | ΔS' dNm | MDR 45 min@160° C. t10 min | t90 min | t90 – t10 min | Mechanical Properties H Sh A | TS MPa | EB % |
|---|---|---|---|---|---|---|---|---|---|---|---|---|
| Ref 1 | Copolymer | 7.5 | 1.07 | <0.01 | 32.1 | 10.1 | 2.9 | 40 | 37.3 | 62 | 19 | 349 |
| Ref 2 | Homopolymer | 7.5 | 1.15 | <0.01 | 26.7 | 12 | 3.4 | 39.9 | 36.5 | 63 | 20.0 | 348 |
| Ref 3 | Copolymer | 12.8 | 3.02 | 0.26 | 47.9 | 14.4 | 8.1 | 37.3 | 29.2 | 60 | 21.5 | 374 |
| Ref 4 | Homopolymer | 13.1 | 3.51 | 0.29 | >50 | 14.3 | 9.4 | 39.6 | 30.2 | 61 | 21.3 | 371 |
| Ref 5 | Homopolymer | 11.0 | 3.21 | 0.27 | 49.1 | 16.1 | 8.2 | 34.9 | 26.7 | 62 | 19.6 | 343 |
| Example 1 | Copolymer | 9.0 | 1.84 | 0.21 | 45.0 | 16.5 | 7.0 | 29.2 | 22.2 | 62 | 17.9 | 323 |
| Example 2 | Copolymer | 7.0 | 0.73 | 0.10 | 19.8 | 17.2 | 5.2 | 24.5 | 19.3 | 62 | 20.6 | 349 |
| Example 3 | Homopolymer | 9.0 | 1.47 | 0.19 | >50 | 16.3 | 7.7 | 25.8 | 18.1 | 61 | 19.9 | 362 |
| Example 4 | Homopolymer | 7.0 | 0.48 | 0.08 | 32.4 | 16.0 | 4.7 | 13.1 | 8.4 | 61 | 21.9 | 403 |

The results in the table show that when the content of resinate anions and second or third main group metal cations is in the range according to the invention, the effective vulcanization time (t90-t10) and the vulcanization time (t90) are reduced at a vulcanization temperature of 160° C.

The invention claimed is:

1. A cross-linkable composition comprising:
a chloroprene rubber comprising:
calcium cations in an amount of 0.05% by weight to 0.25% by weight, based on the total amount of the chloroprene rubber; and
resinate anions in an amount of 0.3% by weight to less than 2.5% by weight, based on the total amount of the chloroprene rubber; and
a metal oxide cross linker of zinc oxide, magnesium oxide, or a combination of zinc oxide and magnesium oxide, and
a vulcanization accelerator of N-methyl-thiazolidine-2-thione.

2. The cross-linkable composition according to claim 1, wherein the amount of resinate anions is 0.4% by weight to 2.3% by weight.

3. The cross-linkable composition according to claim 1, wherein the amount of calcium cations is 0.09% by weight to 0.23% by weight.

4. A process for the production of a vulcanizate, the process comprising heating the cross-linkable composition according claim 1 to a temperature of 100° C. to less than 180° C.

5. A vulcanizate obtained by the process according to claim 4.

6. A molded article of manufacture comprising the vulcanizate according to claim 5.

7. The molded article of manufacture according to claim 6 wherein the article of manufacture comprises an air spring, a conveyor belt, a belt, a cv boot, a bridge bearing, a wiper blade or a diving suit.

8. The process according to claim 4, wherein the temperature is 120° C. to 170° C.

9. The process according to claim 4, wherein the temperature is 140° C. to 160° C.

10. A cross-linkable composition comprising:
a chloroprene rubber comprising:
calcium cations in an amount of 0.05% by weight to 0.25% by weight, based on the total amount of the chloroprene rubber; and
resinate anions in an amount of 0.3% by weight to less than 2.5% by weight, based on the total amount of the chloroprene rubber; and
a metal oxide cross linker of a combination of zinc oxide and magnesium oxide, and
a vulcanization accelerator of N-methyl-thiazolidine-2-thione.

* * * * *